March 20, 1928.  1,663,313
J. W. MOTHERWELL
ADJUSTING MECHANISM FOR PRESSURE GAUGES
Original Filed May 23, 1924
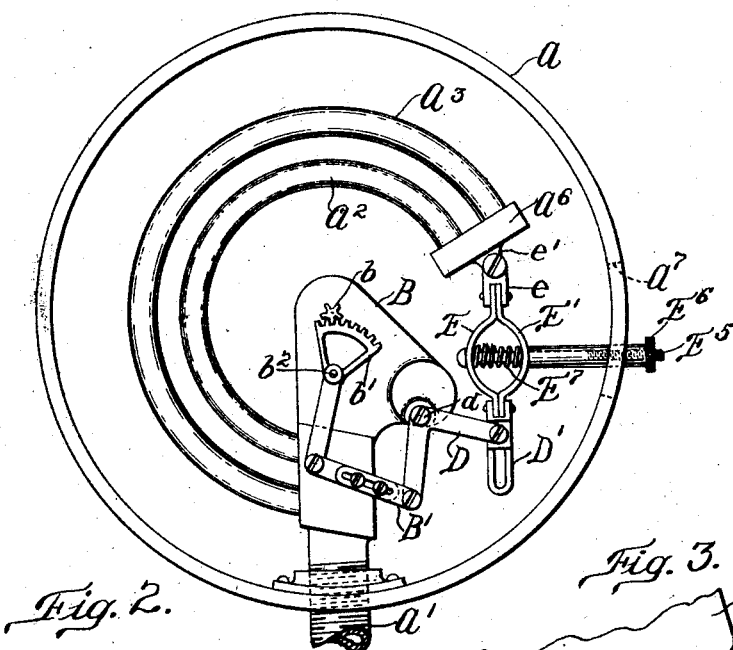
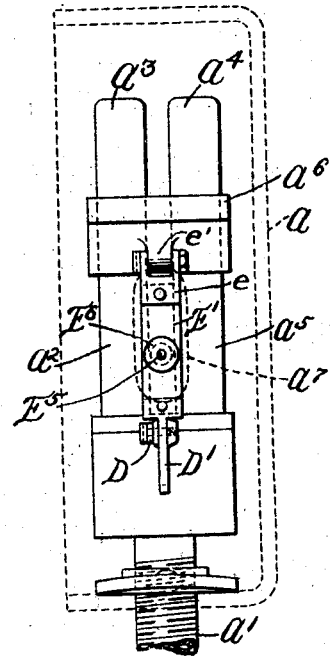
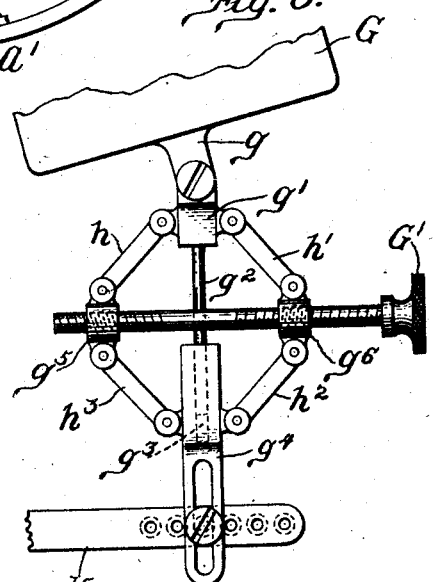
Inventor:
Joseph W. Motherwell,
by George A. Rockwell,
Atty.

Patented Mar. 20, 1928.

1,663,313

UNITED STATES PATENT OFFICE.

JOSEPH W. MOTHERWELL, OF MELROSE, MASSACHUSETTS, ASSIGNOR TO THE ASHTON VALVE COMPANY, A CORPORATION OF MASSACHUSETTS.

ADJUSTING MECHANISM FOR PRESSURE GAUGES.

Continuation of application Serial No. 715,399, filed May 23, 1924. This application filed December 27, 1924. Serial No. 758,414.

The principal object of my invention is to provide an adjusting mechanism for gauges which is easy to operate and which is efficient and which, in the preferred form, is accessible from the exterior of the gauge casing.

A feature of my invention is a single member, movement of which accomplishes adjustment of the gauge.

Another feature is a member, the mere rotation of which accomplishes such adjustment.

Another feature consists in locating the adjusting member so as to be accessible from the exterior of the gauge casing.

Other features will be pointed out below.

In the drawings:

Figure 1 is a front elevation of a gauge, showing the parts which embody my invention;

Figure 2 is a side elevation thereof, some of the parts of Figure 1 being omitted; and Figure 3 is an enlarged detail, illustrating a modification of the adjusting mechanism.

The gauge casing A has the usual inlet A' leading to Bourdon spring tubes $A^2$, $A^3$, $A^4$ and $A^5$, the movable ends of which are rigidly connected by head $A^6$ which has a lug $e'$, pivoted to member $e$. The inlet pipe A' has an extension B which supports the pinion $b$, the latter being rigidly connected to the ordinary indicator, which it is not considered necessary to illustrate. Segment $b'$ pivoted to element B at $b^2$ meshes with pinion $b$ at one end and has its other end pivotally connected to adjustable link B', the latter having pivotal connection with bell crank lever D, pivoted at $d$ to member B said bell crank lever having suitable fixed connection with slotted member D'. Two perforated leaf springs E and E' are rigidly connected at one end to member D' and at the other end to member $e$.

Screw $E^5$ has a head which engages the outside of leaf spring E and has a shank passing through the perforations of both of said leaf springs, nut $E^6$ being movable to force the springs together and thereby increase the distance between members $e$ and D'. Spring $E^7$ is coiled around the shank of screw $E^5$ and tends to force the leaf springs apart so that if the nut is unscrewed the leaf springs will move apart and thereby decrease the distance between members $e$ and D'. The adjustment thus accomplished may be very fine and is accomplished by mere rotation of a single member without any detachment and attachment of elements.

In Figure 3 I show another form of mechanism for adjusting by mere rotation, and in this figure head G may be suitably connected to any desired Bourdon tube or tubes and has lug $g$ pivotally connected to block $g'$ provided with shank $g^2$ sliding in socket $g^3$ in block $g^4$ which is slotted for adjustable engagement with member H to be suitably connected with a segment. Blocks $g^5$ and $g^6$ are interiorly threaded to engage the right and left threading on the shank of screw G' and are pivotally connected to blocks $g'$ and $g^4$ by links $h$, $h'$, $h^2$ and $h^3$ so that when screw G' is turned in one direction blocks $g^5$ and $g^6$ will move toward each other and therefore move blocks $g'$ and $g^4$ farther apart while if the screw is turned in the opposite direction the blocks $g^5$ and $g^6$ will move away from each other and therefore move blocks $g'$ and $g^4$ nearer together.

In order that the adjusting member may be available from the exterior of the casing I provide in the casing an opening $A^7$, through which, in the form shown, extends nut $E^6$.

Among the advantages of my device I may point out that adjustment is had by the movement of a single member and this movement may be very slight and consequently accomplish very fine adjustment and another advantage is that, if desired, this adjustment may be made from the outside of the casing.

What I claim is:

1. A device of the character described comprising an indicator; a Bourdon tube; means to operatively connect said indicator and said tube including two leaf springs; and a member rotatable to adjust said springs.

2. A device of the character described comprising an indicator; a Bourdon tube; means to operatively connect said indicator and said tube including two leaf springs; another spring normally tending to force said leaf springs apart; and a screw and nut cooperating to force the leaf springs toward each other to give relative adjustment between said indicator and said tube.

3. A device of the character described comprising an indicator; a Bourdon tube; means to operatively connect said indicator and said tube including two leaf springs; and a member rotatable to adjust said springs, and means to prevent undesired rotation of said member.

4. A device of the character described comprising an indicator; a Bourdon tube; means to operatively connect said indicator and said tube including two perforated leaf springs; a screw having a head exteriorly engaging one of said leaf springs and having a shank passing through said perforations, said shank having a threaded portion; a nut engaging the outside of the other leaf spring and threaded to engage the threading of said shank to force the leaf springs toward each other to give relative adjustment between said indicator and said tube; and a coiled spring between said leaf springs and coiled around said shank, one end of said coiled spring abutting against the inside of one of the leaf springs and the other end abutting against the inside of the other leaf spring, said coiled spring tending to force one leaf spring against said head and the other against said nut and thereby prevent undesired turning of said nut with relation to said screw.

JOSEPH W. MOTHERWELL.